Aug. 30, 1938. F. A. FOGG 2,128,809

ELECTRIC HEATER FOR STEAM RADIATORS

Filed Sept. 2, 1937 2 Sheets-Sheet 1

Inventor
F. A. Fogg.
L. F. Randolph
By
Attorney

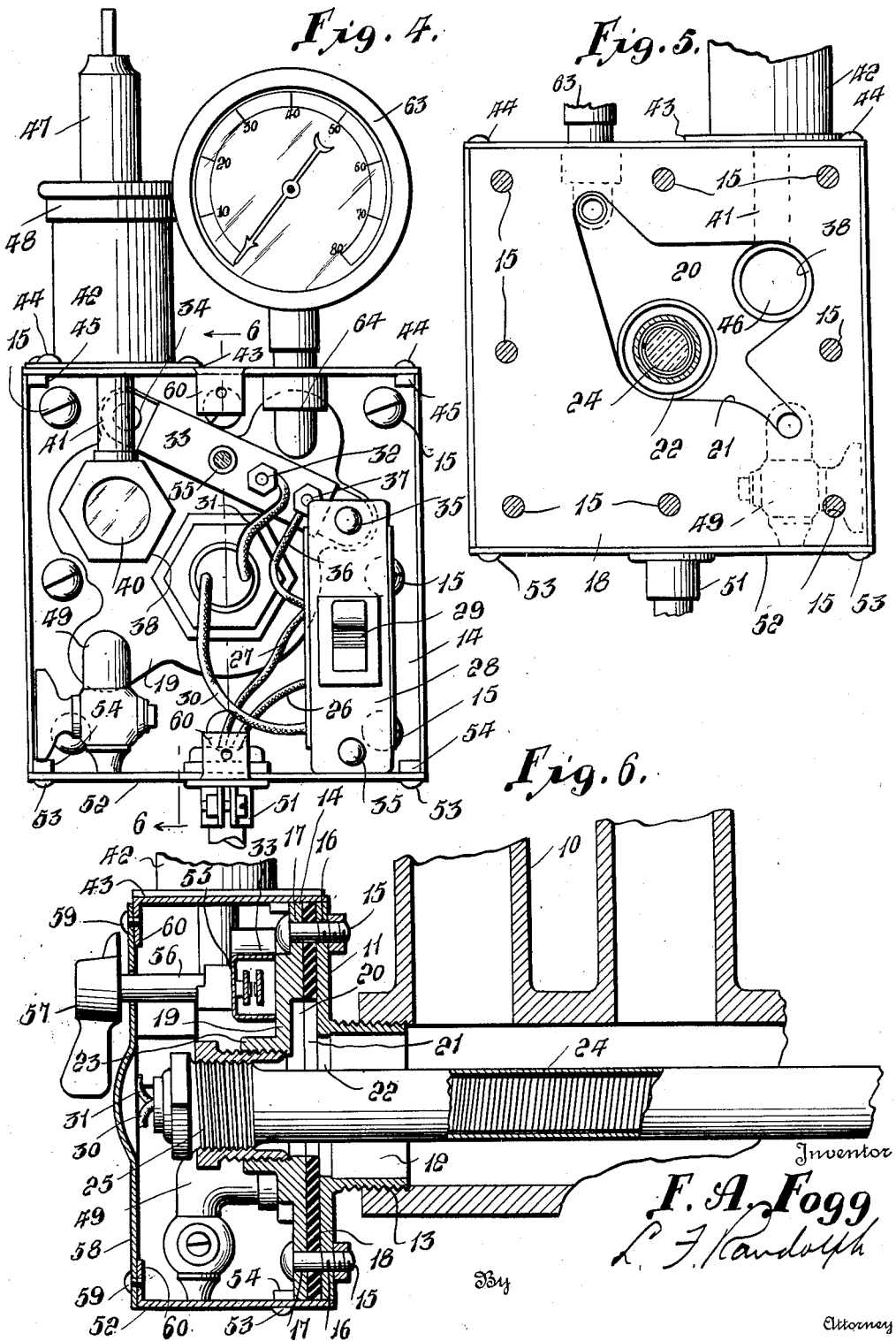

Patented Aug. 30, 1938

2,128,809

UNITED STATES PATENT OFFICE 2,128,809

ELECTRIC HEATER FOR STEAM RADIATORS

Forest A. Fogg, Bath, Maine

Application September 2, 1937, Serial No. 162,191

4 Claims. (Cl. 219—38)

This invention relates to an electric heater or attachment for application to steam or hot water radiators.

It is aimed to provide a novel construction which may be readily attached to the radiator without the use of bolts or screws requiring special fitting to the latter, a construction embodying a novel filling cup, a construction including a switch, thermostat, heater, pressure gauge, safety gauge and drain valve arranged and coacting in a novel relation.

It is also an object to provide a unitary structure capable of attachment and detachment from a plate which is attachable to screw threads of the latter forming part of the original equipment.

The more specific objects and advantages will become apparent from a consideration of the description following taken in connection with accompanying drawings illustrating an operative embodiment.

In said drawings:—

Figure 4 is a view similar to Figure 2, taken on an enlarged scale and having the face plate removed to disclose details;

Figure 5 is a detail section taken on the line 5—5 of Figure 1, and

Figure 6 is a detail section taken on the line 6—6 of Figure 4.

Figure 1:
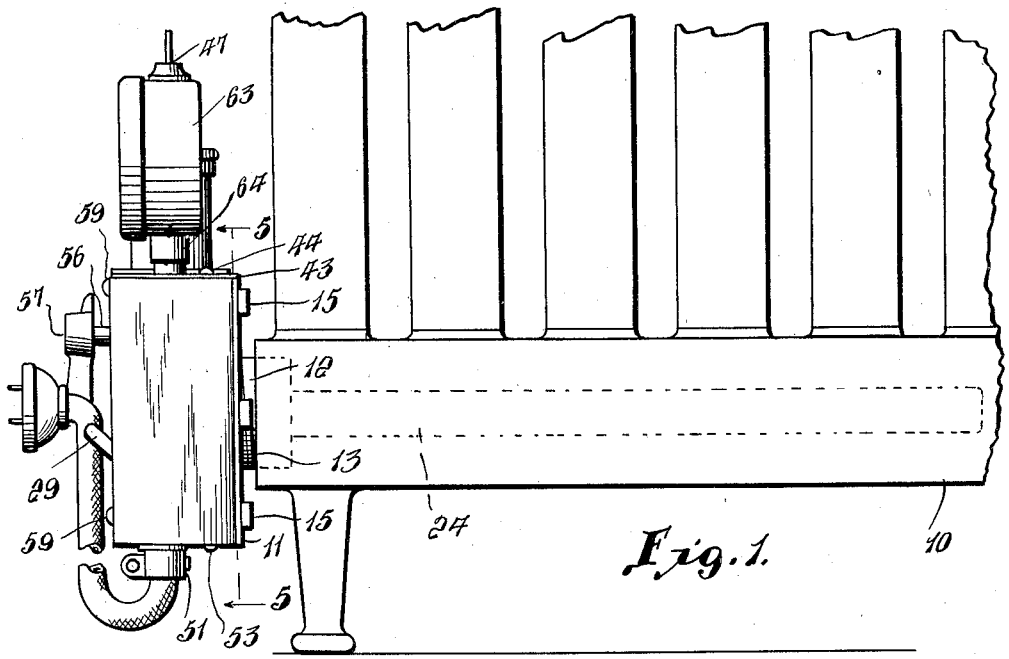
Figure 1 is a view showing the attachment in side elevation and as applied to a fragment of a steam radiator.
Figure 2:
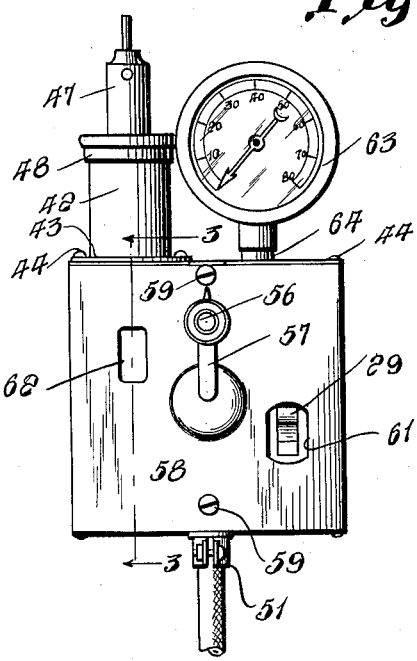
Figure 2 is a front elevation of the attachment or unit.

Referring specifically to the drawings wherein like reference characters designate like or similar parts, a conventional steam radiator is shown at 10 to illustrate the attachment and use of my improvement but it is to be understood that the invention may also be used in connection with a hot water radiator.

In carrying out the invention, an attaching plate or flange is employed at 11 and preferably integral therewith is an externally screw threaded boss or coupling 12 which is screw threaded at 13 to screw threads initially forming part of the steam radiator 10.

A flange or plate 14 separate from the flange or plate 11 is adapted to be detachably secured thereto as through the medium of bolts 15 applicable through openings 16 and 17 in the plates 11 and 14, respectively. A gasket of rubber or the like as at 18 is interposed between the plates 11 and 14 to form a water tight joint and such gasket is penetrated by the aforesaid bolts 15.

The said plate 14 has an offset portion 19 in order to form a reservoir or space 20 in the rear surface thereof, the gasket being cut away as at 21 in line with the reservoir 20 and the plate 11 being open as at 22 in line therewith and with the bore of the boss 12.

An interiorly screw threaded boss 23 extends forwardly from and preferably integral with the offset portion 19 and it is adapted to mount a conventional electric heater generally designated 24, it being noted that the heater is relatively attenuated or small in cross section, since the space within certain radiators is restricted and the structure is adapted to be used practically universally on radiators. In the present instance, the heater has external screw threads 25 detachably connecting it within the boss 23. It will be obvious that adapters may be used where necessary, in connecting heaters such as 24 to the boss 23.

The current for heating element 24 may be supplied from any suitable source. Conductors to feed the current are shown at 26 and 27 leading to a conventional switch device 28 having a pivoted switch button 29 movable to on and off positions.

From the said switch device 28 a conductor 30 leads to one pole of the heating element 24 while a conductor 31 leads from the other pole thereof to one terminal 32 of a thermostatic switch designated 33 and suitably fastened to the plate 14 as by means of a screw 34 and by means of one of the two screws 35 which serve to secure the switch device 28 to the said plate 14. Another conductor 36 leads from the switch device 28 to the other terminal 37 of the thermostatic switch 33. Said thermostatic switch 33 functions automatically according to the temperature of the water or steam within the radiator, to cut off or turn on the electric current, when the switch button 29 of course is moved to "on" position, the entire device being inoperative of course when the said switch button 29 is moved to "off" position.

Figure 3:
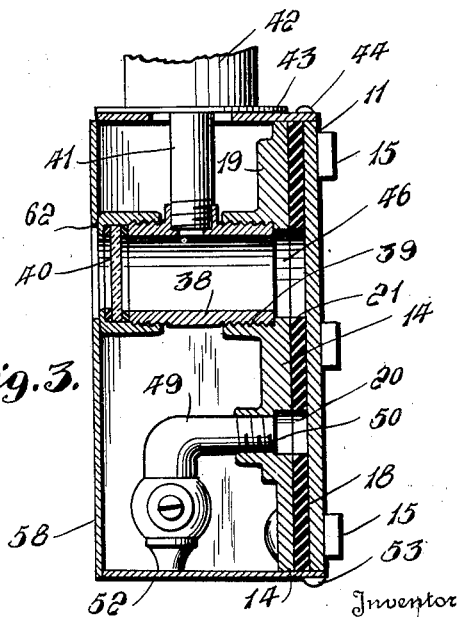
Figure 3 is a vertical section taken on the line 3—3 of Figure 2.

As perhaps best seen in Figure 3 a sight gauge tube structure 38 is connected by screw threads 39 or in any other suitable manner, to the plate 14 and at the front has a transparent window 40, preferably of glass. A tube 41 rises from the sight gauge device 38 and communicates with the interior of a cup 42 mounted on an upper casing plate 43 screwed as at 44 to forwardly extending lugs 45 integral with said plate 14. The interior of said sight gauge device 38 is in communication with the reservoir 20 through an opening 46 in the plate 14.

Water is adapted to be supplied to the radiator through the cup 42 under observation through the window 40, the level usually being about the center of the window 40. A blow-off safety valve structure 47 is carried by a cap 48 detachably screw threaded to the cup 42. This safety valve is of such construction that it is normally closed and remains closed unless the thermostat fails. Therefore when the radiator is filled to the proper level with water, it will remain at that level for several months.

A drain valve or pet cock of conventional form is employed at 49 being screw threaded for instance at 50 to the plate 14 in communication with the reservoir 20.

The wires 26 and 27 preferably enter through a connection 51 carried by a bottom plate 52 detachably screwed as at 53 to lugs 54 like those at 45.

The thermostat 33 is of the variable or adjustable type, having a tube 55 mounting an adjusting rod 56 and a lever 57 to rotate it.

A casing plate 58 of U-shape in horizontal section is disposed over the parts and detachably screwed or otherwise fastened as at 59 to lugs 60 carried by the plates 43 and 52. Such plate 58 has openings therethrough as at 61 and 62, to facilitate operation of the switch 29 and observation of the sight gauge, respectively.

The heater 24 is of the immersion type.

A pressure gauge of conventional form is employed at 63 having a connection 64 in communication with the reservoir 20.

Various changes may be resorted to provided they fall within the spirit and scope of the invention.

I claim as my invention:—

1. In combination with a radiator with an opening thereof having screw threads, a vertical mounting plate having a boss provided with screw threads engaging the first mentioned screw threads, a plate structure substantially co-extensive with and detachably connected to the mounting plate having a reservoir communicating with said boss, a heater screw threaded to the plate structure and extending from the plate structure through said boss into the radiator, thermostatic switch means on the plate structure controlled by the heat of water in the reservoir.

2. In combination with a radiator with an opening thereof having screw threads, a vertical mounting plate having a boss provided with screw threads engaging the first mentioned screw threads, a plate structure substantially co-extensive with and detachably connected to the mounting plate having a reservoir communicating with said boss, a heater screw threaded to the plate structure and extending from the plate structure through said boss into the radiator, thermostatic switch means on the plate structure controlled by the heat of water in the reservoir, a sight gauge carried by the plate structure in communication with the reservoir, and a filling cup mounted on the plate structure for the supply of water to the radiator through the sight gauge.

3. In combination with a radiator with an opening thereof having screw threads, a vertical mounting plate having a boss provided with screw threads engaging the first mentioned screw threads, a plate structure substantially co-extensive with and detachably connected to the mounting plate having a reservoir communicating with said boss, a heater screw threaded to the plate structure and extending from the plate structure through said boss into the radiator, thermostatic switch means on the plate structure controlled by the heat of water in the reservoir, a sight gauge carried by the plate structure in communication with the reservoir, a filling cup mounted on the plate structure for the supply of water to the radiator through the sight gauge, a safety valve having a part constituting a closure for said cup.

4. In combination with a radiator with an opening thereof having screw threads, a vertical mounting plate having a boss provided with screw threads engaging the first mentioned screw threads, a plate structure substantially co-extensive with and detachably connected to the mounting plate having a reservoir communicating with said boss, a heater screw threaded to the plate structure and extending from the plate structure through said boss into the radiator, thermostatic switch means on the plate structure controlled by the heat of water in the reservoir, a sight gauge carried by the plate structure in communication with the reservoir, a filling cup mounted on the plate structure for the supply of water to the radiator through the sight gauge, a drain valve on the plate structure leading from the reservoir, a pressure gauge in communication with the reservoir, and plates forming a casing about the plate structure.

FOREST A. FOGG.